Jan. 30, 1951  S. T. HOWARD  2,539,423
REEL-TYPE OVEN FOR BAKING
Filed April 19, 1946  10 Sheets-Sheet 1

INVENTOR.
Styles T. Howard
BY
W. J. Eccleston,
ATTORNEY

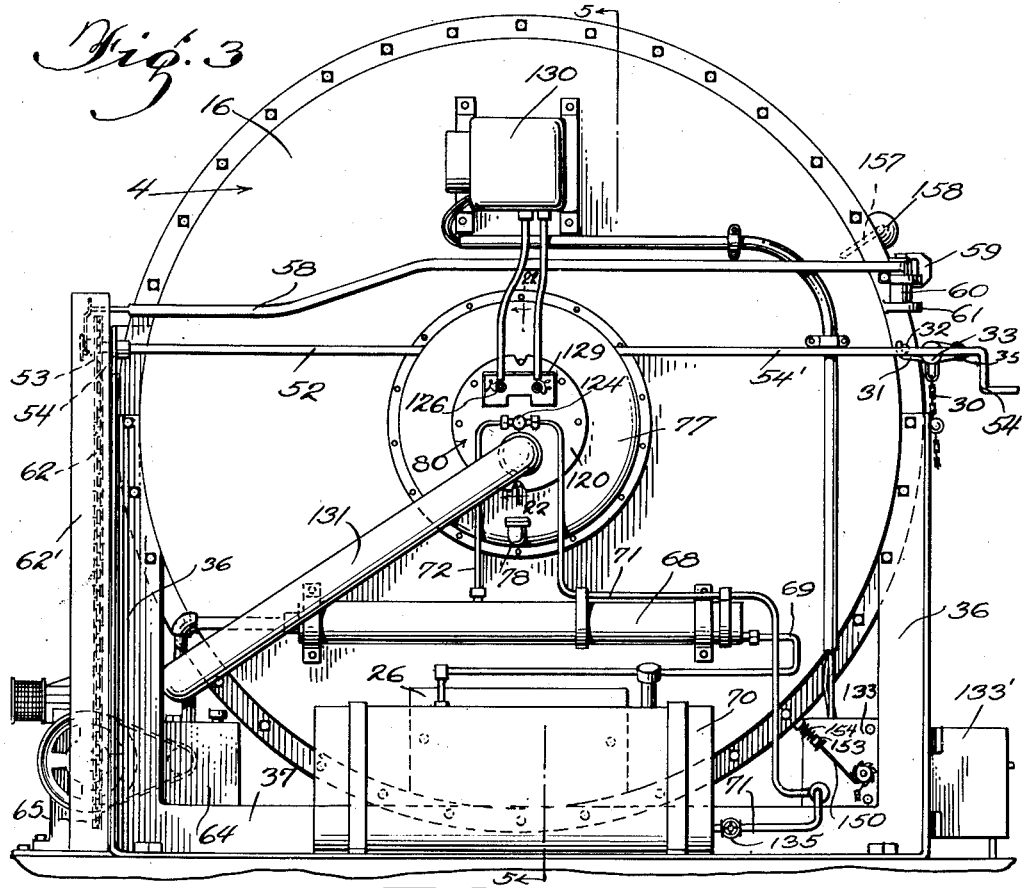
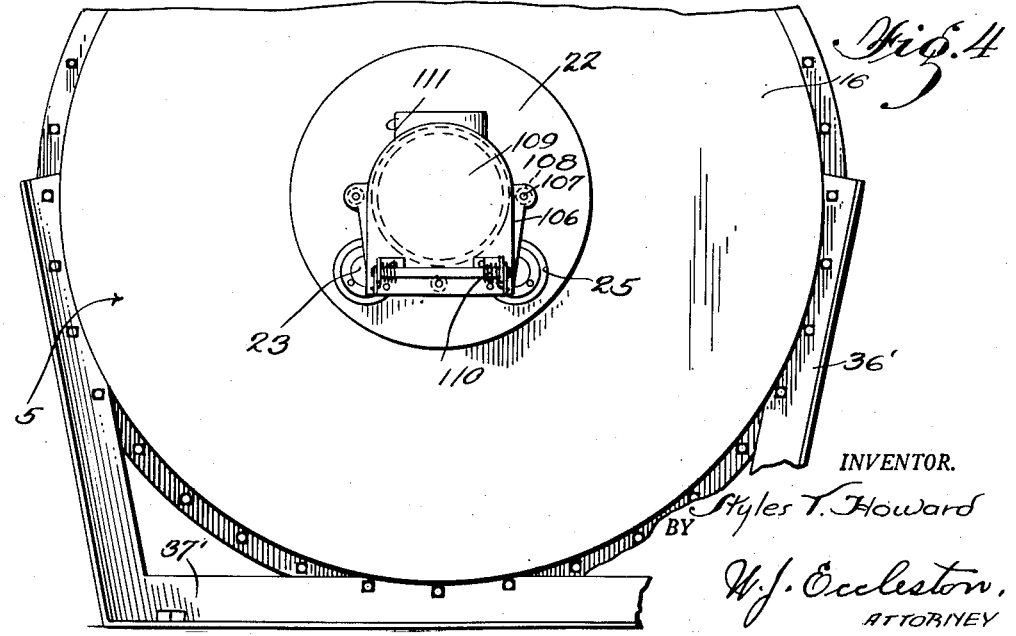

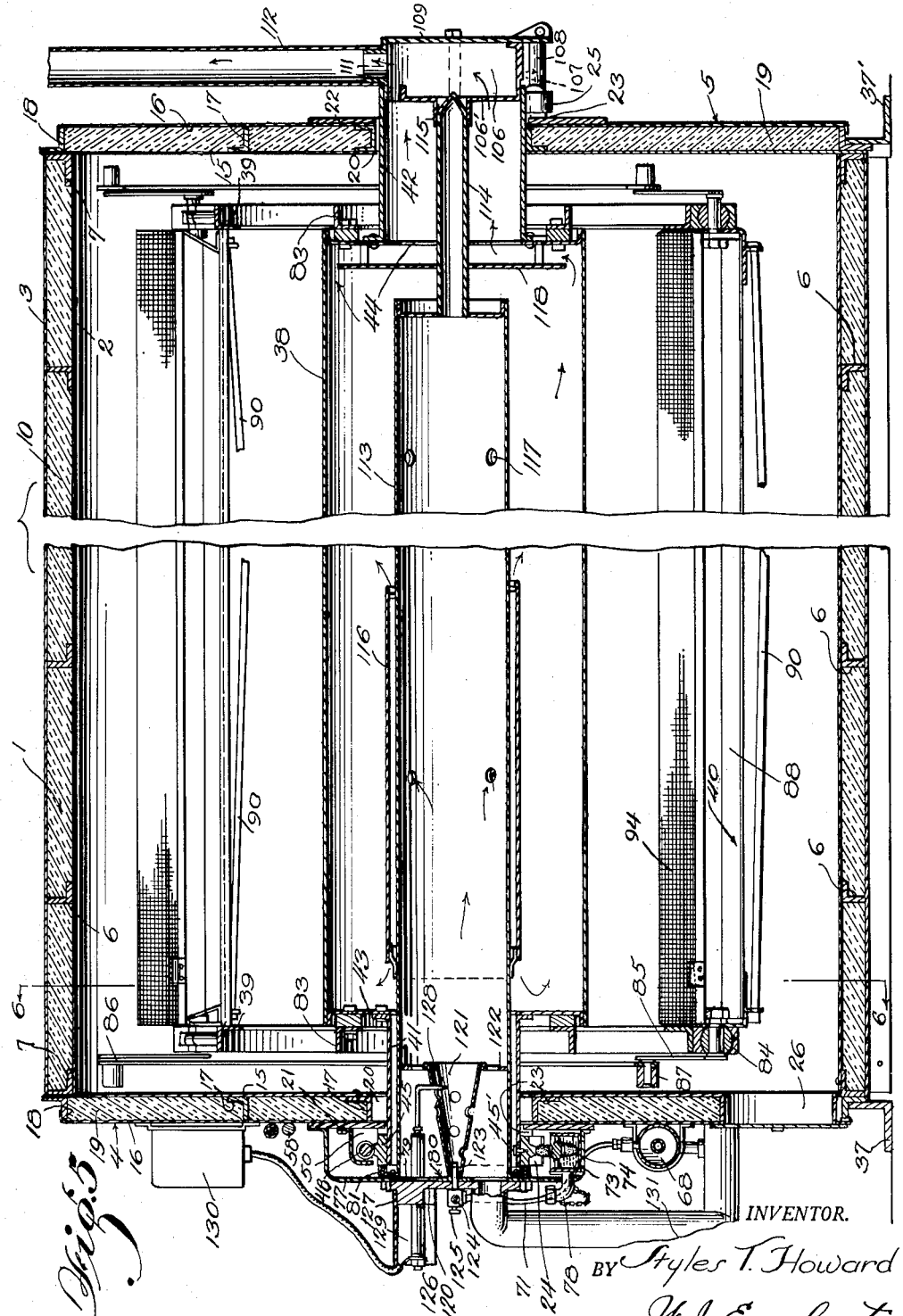

Jan. 30, 1951 S. T. HOWARD 2,539,423
REEL-TYPE OVEN FOR BAKING
Filed April 19, 1946 10 Sheets-Sheet 4

INVENTOR.
Styles T. Howard
BY
W. J. Eccleston,
ATTORNEY

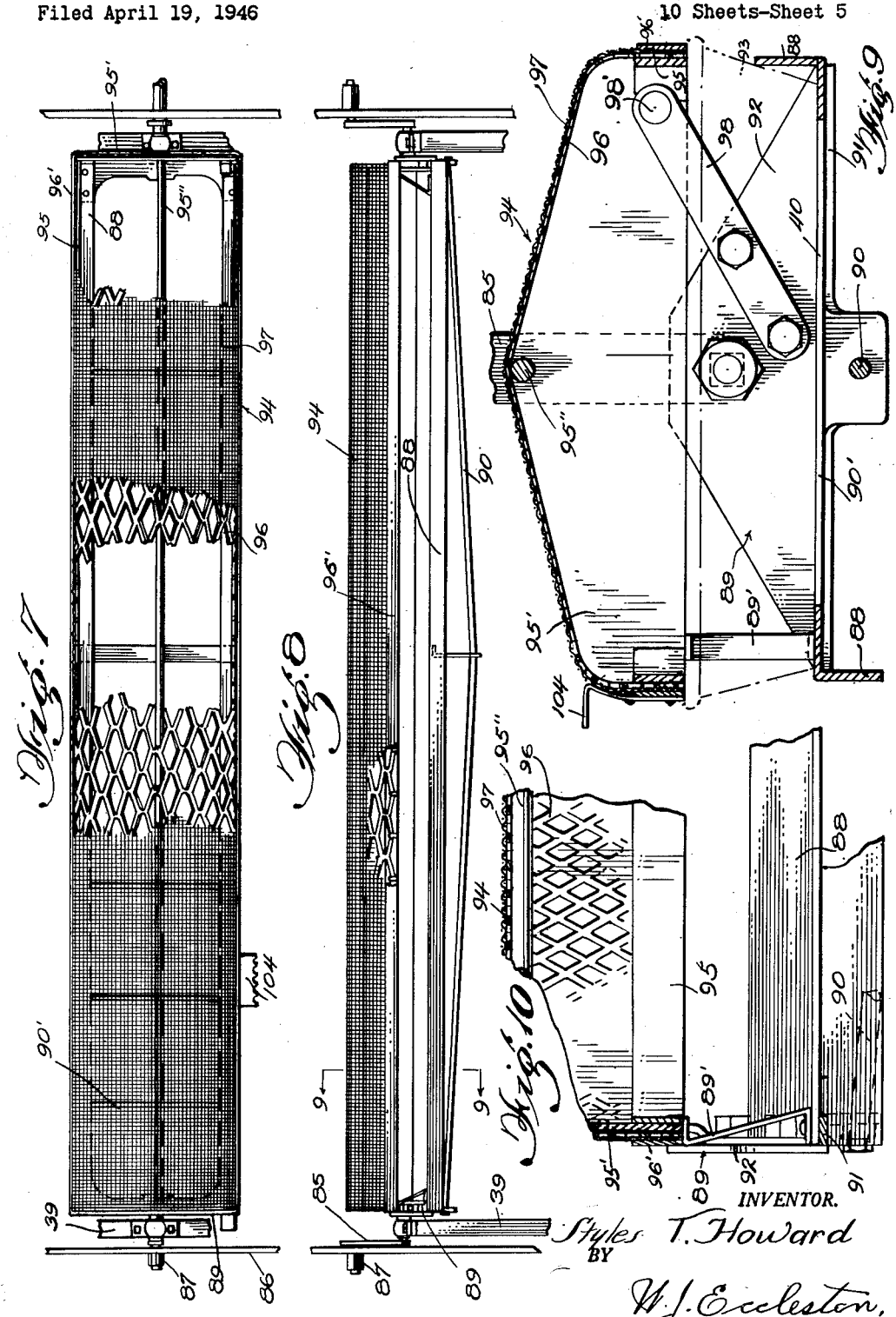

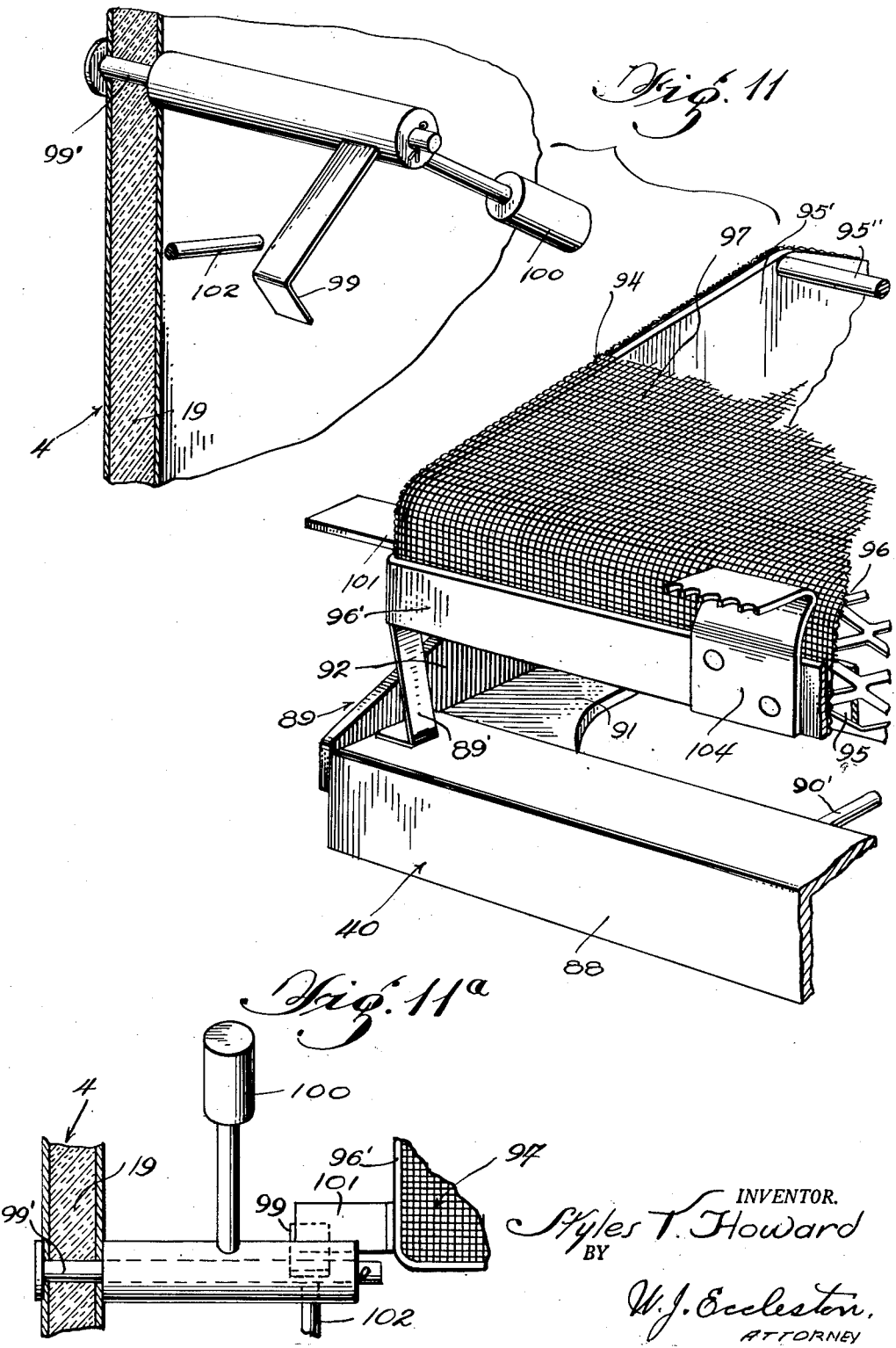

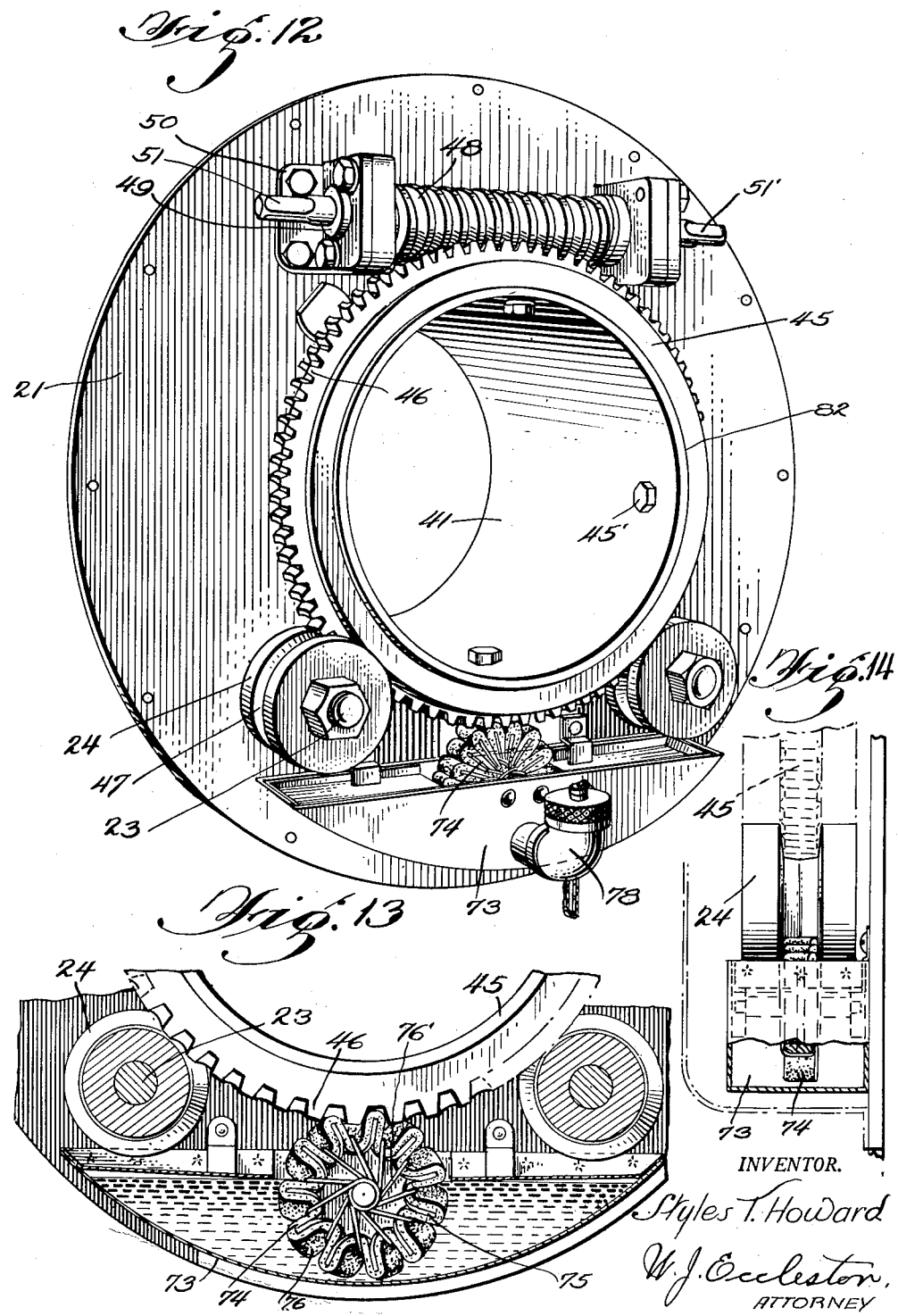

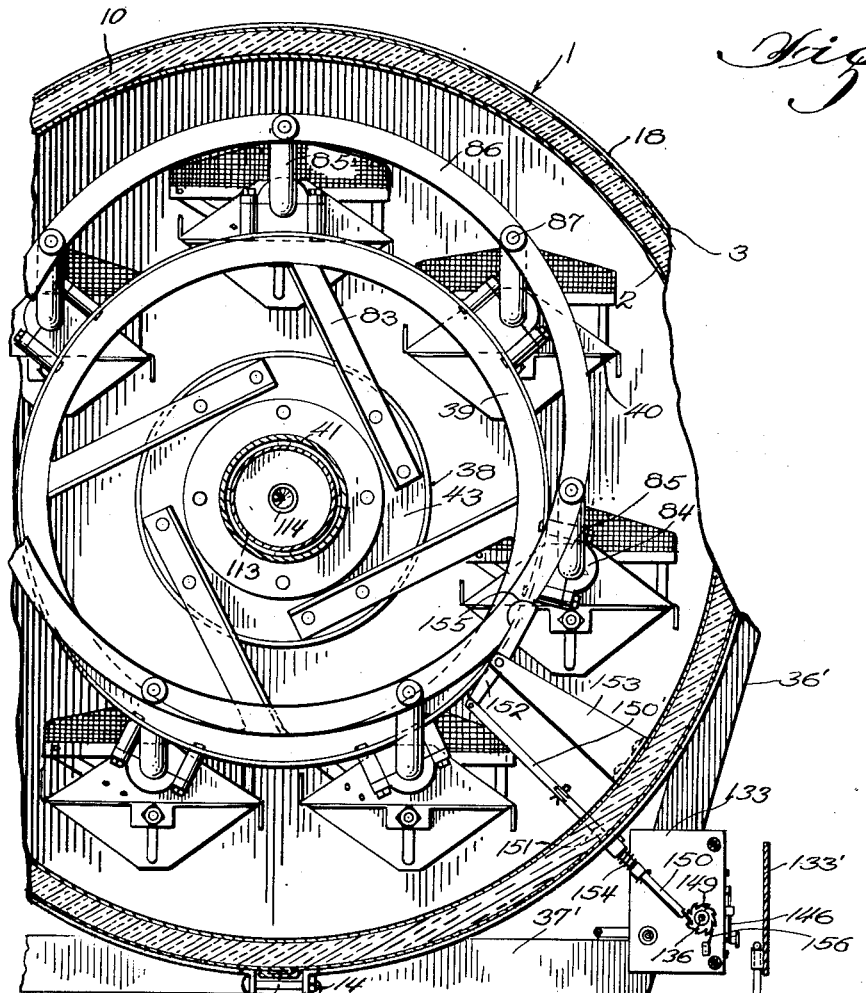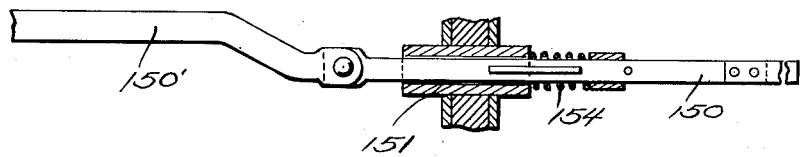

INVENTOR.
Styles T. Howard
BY
W. J. Eccleston.
ATTORNEY

Patented Jan. 30, 1951

2,539,423

UNITED STATES PATENT OFFICE 2,539,423

REEL-TYPE OVEN FOR BAKING

Styles T. Howard, Jeffersonville, Ind.

Application April 19, 1946, Serial No. 663,341

18 Claims. (Cl. 107—59)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to a baker's oven, and more particularly, to an oven of the reel type used in the baking of bread, pastry and like products.

The invention has for one of its principal objects the provision of an oven of the kind described wherein a uniform heating and baking of the products therein is made possible, thus assuring a uniform texture and quality of the products.

Another object of this invention is to provide an oven heated by a fuel burner in which the fuel is fed under pressure to a spark-ignited burner and in which the burner and fuel feed are operated intermittently to maintain substantially constant temperature conditions.

Another object of the invention is the provision of a reel-type oven so constructed, and having a burner and flue so arranged, that an even distribution of heat throughout the baking space is assured whereby an even heating of the products of the oven is obtained, whether the operating temperature of the oven is high or low and whether the burner is continuously or intermittently operated.

A further object of the invention is to provide a reel-type oven having a temperature-regulating system consisting of a time-controlling device operating and controlling the burner intermittently.

Still another object of the invention is to provide an oven having an intermittently operated burner and having a temperature-control system for selectively determining the period of intermittent burning and thus regulating the amount of heat ultimately produced.

A still further object of the invention is the provision of an automatic lubricating system for the driving mechanism of an oven of the type described, whereby the parts of the driving mechanism are automatically kept in a thoroughly lubricated condition, which ordinarily would be lacking because of the proximity of such parts to the highly heated portions of the oven.

It is another object of this invention to provide an improved reel-type oven having shelves for supporting baking pans, and a screen for covering each of the pans to prevent overbaking the tops of the products.

The above and other objects of the invention are accomplished by the provision of an oven of the reel type having a construction, and arrangement of parts, and a burner and timing system as described in the following specification and illustrated in the drawings accompanying the same wherein:

Figure 3 is an end elevational view of the oven looking at the burner end of the oven;

Figure 4 is an end elevational view looking at the exhaust end of the oven;

Figure 5 is a longitudinal sectional view of the oven taken on line 5—5 of Figure 3 and showing the interior construction and with the fuel tank removed;

Figure 7 is a detail plan view of one of the baking pan shelves with the screen thereon and with parts cut away to show the construction;

Figure 8 is a detail front elevational view of the baking pan shelf with the screen thereon and with parts cut away to show the construction;

Figure 9 is a transverse sectional detail of the baking pan shelf with the screen thereon taken on line 9—9 of Figure 8;

Figure 10 is an enlarged fragmentary detail showing one end of the baking pan shelf with the screen thereon;

Figure 11 is an enlarged fragmentary oblique detail showing the release position of the mechanism for holding the pan screen in raised position;

Figure 11a is an enlarged fragmentary detail in plan view of the pan screen holding mechanism in holding or locking position;

Figure 12 is an enlarged oblique detail of part of the driving mechanism for the oven radiator and reel, and showing the lubricating mechanism;

Figure 13 is an enlarged fragmentary sectional detail of the lubricating mechanism;

Figure 14 is an enlarged detail end view of the lubricating mechanism;

Figure 15 is a transverse sectional view of the oven taken on line 15—15 of Figure 1, and with part of the oven broken away;

Figure 16 is a fragmentary detail showing the control linkage for operating the timing mechanism;

Figure 6:
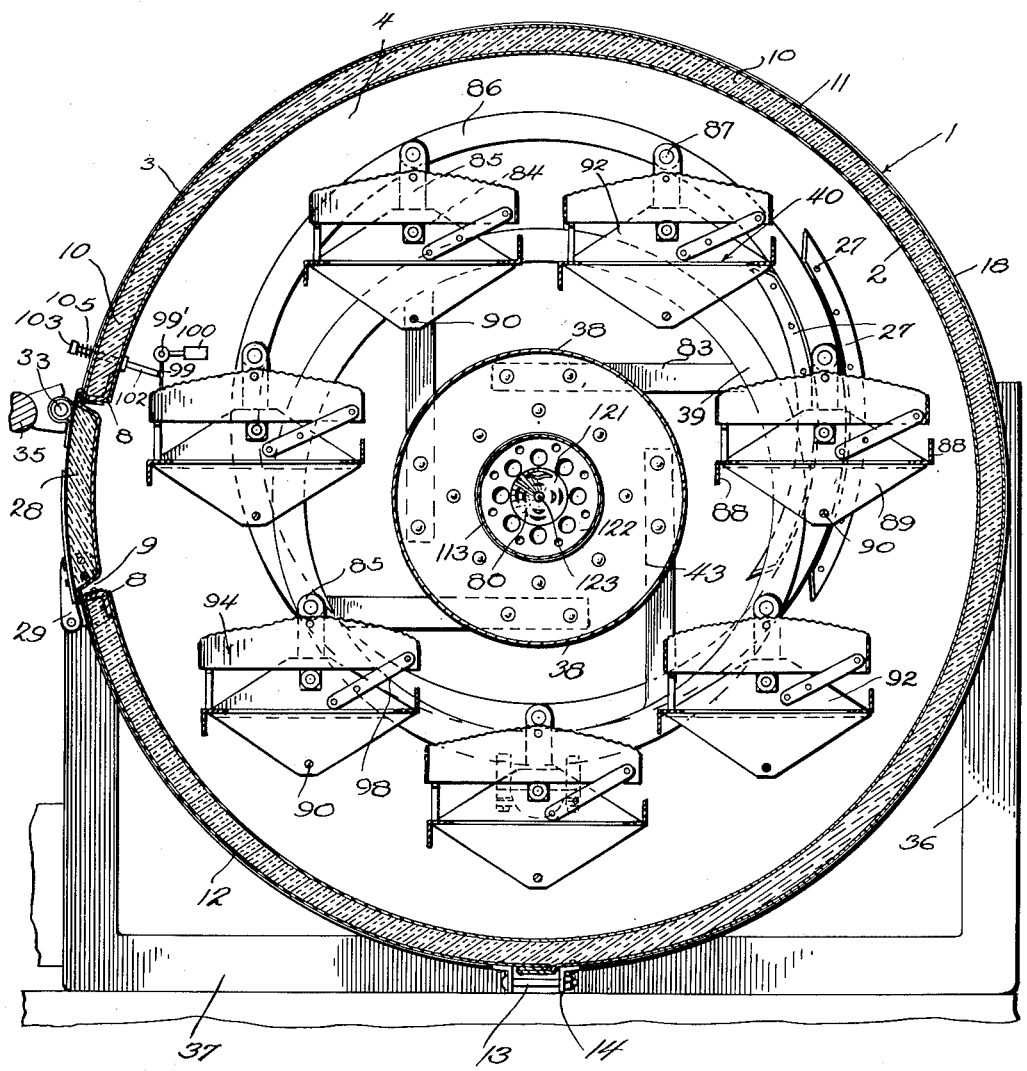
Figure 6 is a transverse sectional view of the oven taken on line 6—6 of Figure 5 and showing the interior construction.

In the drawings, 1 is the body of the oven which is of cylindrical shape and composed of inner and outer cylindrical shells 2 and 3, respectively, circular end member 4 at the burner end of the oven and circular end member 5 at the exhaust end. The inner cylindrical shell 2 is formed of sheet metal reinforced at intervals along its length by the circular steel angle members 6 (Figure 5) and at the ends by the rings 7, also of steel angle. Longitudinally positioned spaced-apart angle members 8 (Figure 6) connect the end ring angles 7 and define therewith a wide door opening 9 in the front of the oven body. The outer cylindrical shell 3 of the oven body is likewise of sheet metal spaced from the inner cylindrical shell by the reinforcing angles 6 and end rings 7, and the space between the two shells is preferably filled with suitable insulating material 10, such as asbestos. The outer shell 3 is preferably made of two circular sections 11 and 12, each fastened to one of the door-opening angles 8 and connected to each other in tight relationship at the bottom of the oven body by suitable means, such as the bolts 13 passing through angles 14 secured to the sections 11 and 12.

The end members 4 and 5 each consist of inner and outer spaced-apart circular sheet-metal plates 15 and 16, respectively (Figure 5). The inner plates 15 each have secured thereto a frame 17 of angles, and a peripheral ring 18, which serve to stiffen and reinforce the end members. Insulating material 19, such as asbestos, fills the space between the inner and outer plates 15 and 16. An opening 20 is formed in each of the end members 4 and 5, about which heavy perforated circular plates 21 and 22, respectively, are secured by means of suitable bolts 23. The lowermost bolts 23 support rollers 24 at the burner end and 25 at the exhaust end for a purpose described hereinafter. The end member 4 at the burner end of the oven also has a clean-out door 26 located at the bottom thereof. Approximately at the height of the oven-door opening 9, the inner plate of each of the end members 4 and 5 is provided with a fixed curved guide channel 27 (Figure 6) whose purpose will be described later.

Figure 1:
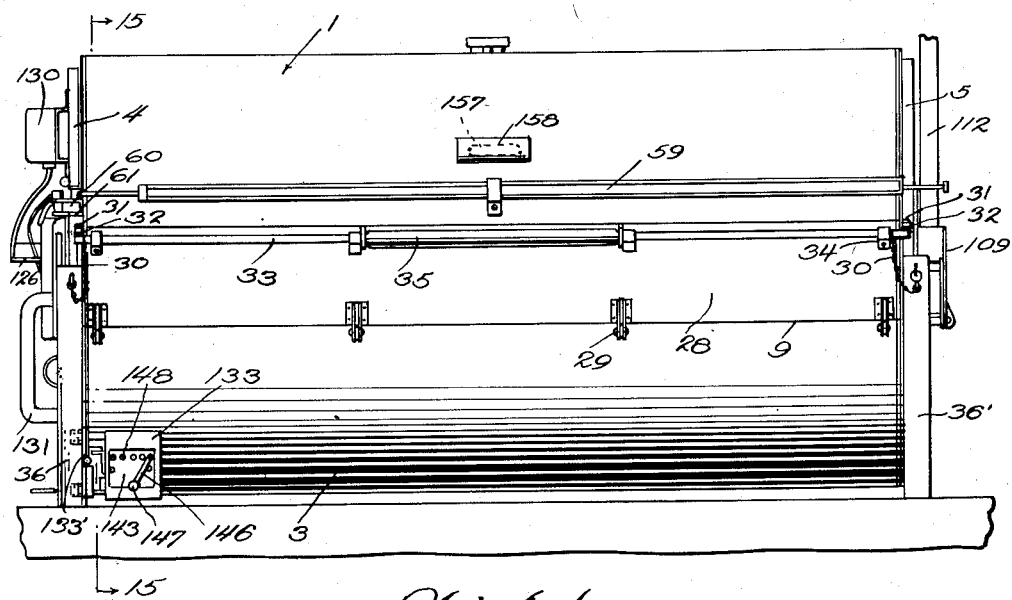
Figure 1 is a front elevational view of the reel-type oven of this invention.

A door 28 (Figures 1 and 6) is hinged at 29, along its bottom edge, to the lower edge of the door opening 9, and is provided at each end with a stay chain 30 (Figure 3) and with a door latch 31 hooking around a roller stud keeper 32 fixed on each end of the oven body 1. The door latches 31 are fixed on the ends of a shaft 33, mounted on door 28 by straps 34 and rotatable about its axis by means of a handle 35, to raise or lower the latches 31 to locking or unlocking position. The stay chains 30 support the door in a horizontal open position for loading or unloading the oven.

The above-described oven-body structure is supported by any suitable means such as angle members formed of the upright sections 36 and 36', and horizontal sections 37 and 37', secured to the end rings 7 and 18. The oven structure may be mounted on a truck for portability or may be mounted as a fixed installation.

Figure 2:
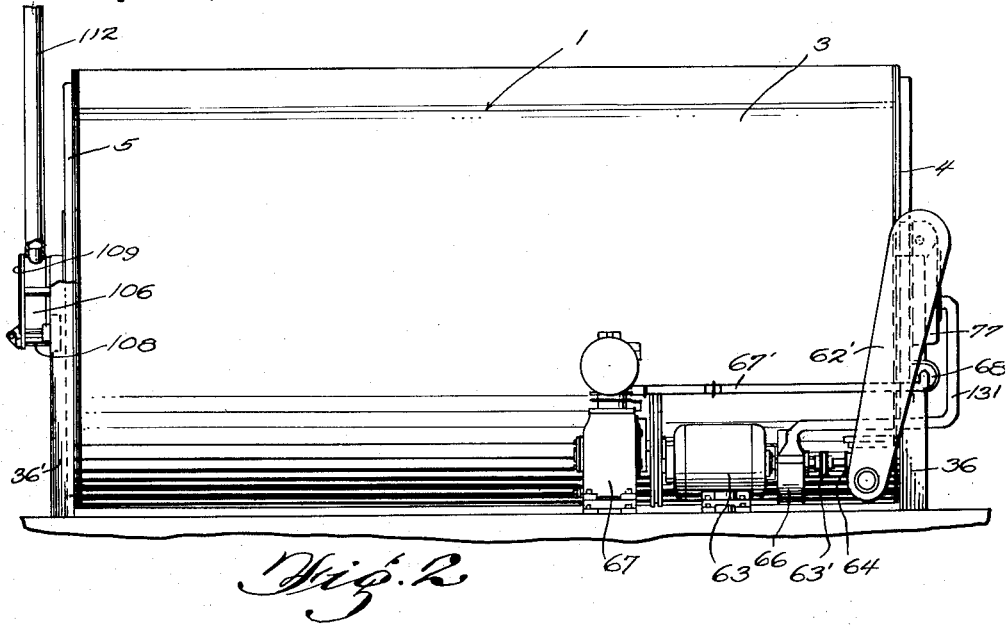
Figure 2 is a rear elevational view of the oven of this invention.
Figure 22:
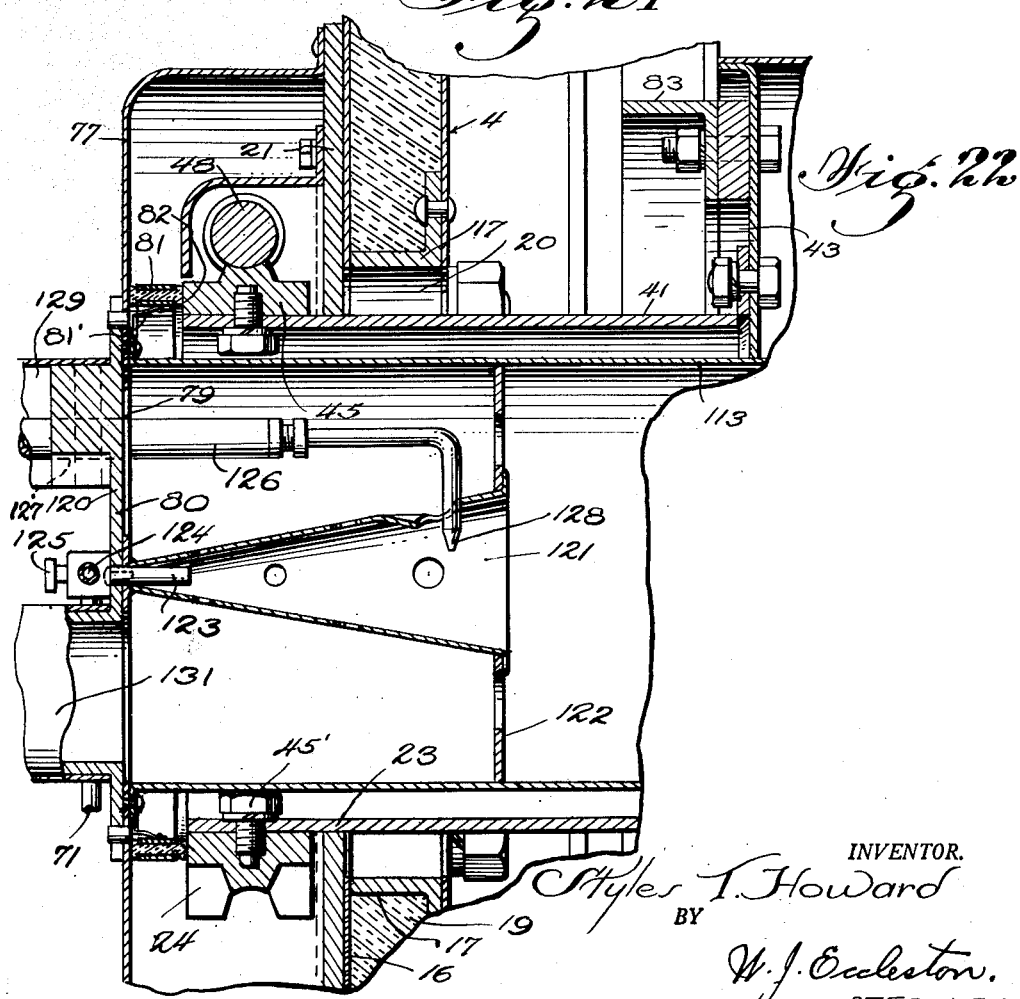
Figure 22 is a fragmentary sectional detail taken on line 22—22 of Figure 3 and showing the burner mechanism.

The reel of the oven is composed of a rotary radiator tube 38 (Figures 5, 6 and 15), shelf-supporting rings 39 at each end of the oven, and the shelves 40, described in detail hereinafter. The radiator tube or flue 38 extends substantially the entire length of the interior of the oven and has fixed to its ends the terminal tubes 41 and 42 of smaller diameter than the radiator tube and projecting outwardly beyond the end members 4 and 5 of the oven through the holes 20 therein. These open tubes 41 and 42 have flanges at their inner ends which are bolted to the plates 43 and 44, welded within the ends of the radiator tube. At the burner end of the oven the outer end of tube 41 has secured thereto a worm gear ring 45 (Figures 5, 12 and 22) by means of bolts 45'. The worm gear ring 45 is supported for free rotation on the rollers 24, the gear teeth 46 of the gear ring extending into central grooves 47 of the rollers 24 to prevent endwise movement of the gear ring and radiator tube 38 and yet provide for rotation of the same about its longitudinal axis. At the end of the oven remote from the burner, i. e., the exhaust end, the open tube 42 of the radiator tube 38 is supported for free rotation on the rollers 25 secured to the plate 22. The worm gear ring 45 is actuated by a worm 48 located above the same and mounted for rotation on plate 21 on end member 4 at the burner end of the oven by means of bearings 49 held in angle brackets 50. The worm 48 has a squared projection 51 at one end which fits into a socket on the end of a shaft 52 (Figure 3), carrying at its other end a chain-driven sprocket wheel 53. The sprocket wheel 53 has a clutch connection 54 to the shaft 52, the clutch 54 being maintained in engagement by a spring in conventional manner. A clutch bar 58 is provided which extends across the end of the oven, so that it can be moved, as described hereinafter, to push the sprocket wheel 53 outwardly against the tension of the clutch spring, thus releasing the clutch 54 and stopping the oven reel. The clutch 54 is designed to slip on overload to prevent damage to the apparatus from overloading, or other cause. The clutch bar 58 is moved by a hand-operated shifting pole 59 (Figures 1 and 3), horizontally positioned above the door opening 9, which pole is pivotally connected to the bell crank 60, pivotally connected to the clutch bar 58, and fulcrumed on fixed bracket 61 mounted on the oven body. Shifting the pole 59 endwise will operate clutch bar 58 to disengage the clutch 54. The sprocket chain 62, driving sprocket wheel 53, may be driven by any suitable means such as the electric motor 63 (Figure 2), through a flexible coupling 63', the speed reducer 64 and sprocket 65. A shield 62' is utilized to cover the chain 62 and sprockets 53 and 65 for reasons of safety. It is thus evident that the radiator tube 38, and tubes 41 and 42, are rotated through motor 63, coupling 63', speed reducer 64, sprocket 65, chain 62, sprocket 53, shaft 52, worm 48 and worm gear ring 45. The other end of worm 48 has a squared projection 51' (Figure 12) which is engageable by a hand crank 54' (Figure 3) for turning the oven reel by hand whenever it is deemed desirable. The motor 63 also operates a blower 66 (Figure 2) and an air compressor 67. Air from the compressor 67 is forced through pipe 67' into a receiver 68 (Figure 3) from whence it passes by the tube 69 to the fuel tank 70 for maintaining the supply of fuel to the burner system of the oven through the tube 71. The tube 71 is provided with a conventional, readily removable strainer (not shown) for removing foreign particles from the fuel. The compressor 67 also forces air through receiver 68 and tube 72 to the burner nozzle for mixing with the fuel. The blower 66 drives air into the combustion chamber through pipe 131 providing for complete combustion in the chamber.

To provide for the lubrication of the worm gear 45, worm 48, and rollers 24 during rotation of the oven reel, there is provided an oil container 73 (Figures 5, 12, 13 and 14) attached to the plate 21, beneath the rollers 24, and having a free-turning, oil-distributing wheel 74 journaled therein. The bottom of the oil container 73 is rounded for a purpose later to be explained. The oil-distributing wheel 74 has blades 75 which are covered with a suitable oil-carrying material such as felt. For this purpose a strip of felt 76 is folded over the outer ends of the blades 75, to extend between the blades, and secured to the wheel 74 by a soft-metal wire 76' wound about the axle of the wheel and between the blades, thus holding the felt tightly on the blades. The felt-covered teeth of the wheel 74, formed as described, mesh with the teeth 46 of the worm gear 45, and, dipping into the oil in the container 73, convey the same to each tooth of the worm gear. As the gear 45 is turned, the oil is carried by the teeth 46 to the rollers 24 and to worm 48, and then conveyed by the latter to flow to the bearings 49.

The gear 45, worm 48, rollers 24, and the above-described lubricating mechanism for the same, are all inclosed in the housing 77 (Figures 3 and 5) secured to the plate 21 on the burner end of the oven. The bottom of the oil container 73 is rounded so that the same can be encompassed conveniently by the housing 77. A filling nozzle 78 projects through the housing 77 to enable the oil container 73 to be filled from the outside of the housing. The housing 77 has a central opening 79 therethrough to receive the burner 80, to be described hereinafter. Around opening 79 and extending inwardly from housing 77 is an asbestos sealing ring 81 (Figure 21) which is spring actuated by supporting springs 81', mounted on housing 77, to press against the surface 82 of ring gear 45 and against housing 77 to prevent combustion gases from entering the baking chamber through housing 77 and opening 20 in end plate 4.

The shelf-supporting rings 39 (Figures 5, 6 and 15), one at each end of the oven, are of angle cross-section and are secured to the radiator tube 38 for rotation therewith by means of the angles 83, which are conveniently welded to the rings 39 and bolted to the plates 43 and 44 within the ends of the radiator tube. Bearings 84 are secured, at evenly spaced locations about the periphery of the shelf rings 39, which bearings pivotally support stabilizer arms 85 whose opposite ends are pivoted in the stabilizer tie rings 86. The ends of the stabilizer arms 85, which are pivoted in the stabilizer rings 86, bear rollers 87 for a purpose later to appear. The shelves 40 are rigidly secured to the stabilizer arms 85 at the bearings 84. The parts are so designed that as the drive mechanism rotates the radiator tube 38 and the shelf-supporting rings 39, the stabilizer tie rings 86 will rotate in synchronism in such manner, and as described hereinafter, that the stabilizer arms 85 will be substantially vertical at all times, thus keeping the shelves 40 in a horizontally disposed position at all times.

The shelves 40 (Figures 5, 6, 7, 8, 9, 10 and 11) each consist of an elongated rectangular frame formed of a pair of front and rear steel angles 88 connected at their ends by angle plates 89 and stiffened by a longitudinal truss rod 90 and transverse tie rods 90'. The angle plates 89 have horizontal portions 91 for carrying angles 88, and vertical, perforated, triangular portions 92 rigidly secured to the stabilizer arms 85. The angle 88 at the rear edge of the shelf is positioned with its upstanding edge projecting upwardly, while the angle 88 at the forward edge has its upstanding edge projecting downwardly to facilitate inserting and removing pans. In order to prevent overbaking the tops of the loaves of bread in the pans 93 (shown by dotted lines in Figure 9) on the shelves 40, there is preferably provided a heat screen, denoted generally by 94, to be attached to each shelf. The screen has a light, metal, rigid frame comprising side members 95, triangular end members 95' fixed to members 95 and a bar 95'' interconnecting the tops of the end members 95'. The frame supports an expanded metal arch 96, over which is stretched one thickness of fine-mesh wire cloth 97. If desired, an outer strap 96' may encircle the base of the screen 94. The frame is hinged at 98' at pan height above the shelf to brackets 98 suitably fixed to the plates 89. Figure 9 shows a baking pan 93 in position denoted by dotted lines. At the front side, the heat screen in lowered position rests on the front edges of the pans 93. When the shelves are empty, or when smaller pans are used, the front end of the screen may be also supported in its low position by a member 89' fixed on one end of the shelf, as shown in Figures 9 and 10. For holding the screen open in its raised position in the region of door opening 9 when pans are to be inserted and/or removed, there is provided a hook 99 (Figures 6, 11 and 11a) pivoted in the end wall 4 at 99' and weighted by a weight 100 to maintain the hook in open, outward position when free, as shown in Figure 11. A keeper 101 is fixed to the frame member 95' of the screen and projects therefrom for cooperation with the hook 99. Extending through an opening in the oven over the door, a rod 102 is provided, having a knob 103 (Figure 6) thereon for abutting and pushing the latching hook 99 inwardly to engage the keeper 101 to hold the screen open in its raised position when inserting or removing pans. In use, when a shelf 40 is stopped at door level, the operator lifts the front end of the screen 94 by taking hold of the toothed lifting plate 104, fixed on the front end of the screen, and then with the other hand pushes the knob 103 to push the hook 99 inwardly to engage the keeper 101 to hold the screen in its raised position. The weight of the screen will provide sufficient friction to hold the latch hook 99 and keeper 101 in locking engagement. Then when the shelf 40 is loaded and the reel is set in motion again, upwardly past the door, the top of the rising pan 93 on the shelf will engage the screen 94 and lift same and also the keeper 101 from the latching hook 99. The hook 99 then returns to its open, outward position under the influence of the weight 100. A coil spring 105 is utilized to return knob 103 to its original outward position when released.

In order to stabilize the shelves 40 to remain in a horizontal position throughout the path, the end members 4 and 5 of the oven have the guide channels 27 (Figure 6) secured to the inner plates thereof. The rollers 87, spaced about the stabilizer tie rings 86, successively enter the guide channels 27, thus maintaining at all times the relative position of each tie ring 86 and its complemental shelf-supporting ring 39. In other words, a roller 87 is at all times guided by channel 27 to control the path of rotation of tie ring 86 to insure that the stabilizer arms 85 are always vertically disposed to maintain the shelves 40 in a horizontal position.

A stack-supporting tubular bracket 106 (Figures 4 and 5) is inserted into the exhaust end of the radiator tube 38, telescoping within the end of the tube portion 42 in a loose manner, to permit expansion of the radiator tube and to permit rotation of the radiator tube relative to the bracket 106. The bracket 106 forms a continuation of the exhaust passage and is fixed to plate 22 by suitable bolts 107 and spacers 108. A safety door 109 is hinged to the outer open end of the bracket 106 and is held closed by a spring 110, so that it can open outwardly to relieve pressure in the radiator tube due to explosion of gases therein. A flange 111 is provided on bracket 106 for attaching the exhaust pipe 112. A reinforcing spider 106' extends transversely within frame 106 and permits escape of exhaust gases therethrough.

The burner system of the oven includes a stationary fire tube 113 (Figures 5 and 22) extending through the radiator tube 38, which fire tube is supported by suitable bolts at the burner end in the housing 77. At the exhaust end the fire tube is provided with a tubular projection 114 for reception in a ring 115 mounted centrally on the spider 106'. The fire tube 113 is preferably made of stainless steel to resist the corrosive action of the burner flame. A tubular shield 116 fixed to the fire tube covers that portion of the fire tube receiving the most intense heat of the burner, and the fire tube has spaced perforations 117, which perforations are spaced closer together approaching the exhaust end of the tube. A vertically positioned baffle plate 118 is mounted in the radiator tube near its exhaust end, which baffle plate is of smaller diameter than the radiator tube, the arrangement being such that the exhaust gases must leave the radiator (as shown by arrows in Figure 5) at a location near the surface thereof. This arrangement of baffle plate 118, shield 116, and perforations 117 is for the purpose of assuring an even distribution of heat inside the radiator tube by increasing the amount of heat radiated adjacent the exhaust end of the radiator tube 38 and decreasing the amount of heat radiated adjacent the burner end of the tube.

The oven is preferably heated by an oil or gasoline burner 80 (Figures 3, 5, 6 and 22) consisting of the base plate 120 to which is attached the perforated cone 121, preferably of stainless steel and having a perforated air dispersal plate 122 at its outer end, extending into the fire tube 113. A nozzle 123 for mixing air and fuel for burning is located in the axis of the perforated cone and is connected by the tube 72 to the air-supply receiver 68 and by the tube 71 to the fuel tank 70. A valve 124, including a control needle 125, controls the flow of the fuel to the nozzle 123. Ignition of the fuel is accomplished in any recognized manner, as by the electrodes 126 inserted through holes 127 in the base plate 120, forming a spark gap at 128 near the large end of the perforated cone 121. The terminals of electrodes 126 are partially covered by the shield 129, and ignition is supplied by a standard step-up ignition transformer 130 connected to electrodes 126. The blower 66 drives air into the combustion chamber through tube 131, providing for complete combustion in the fire tube 113.

Figure 19:
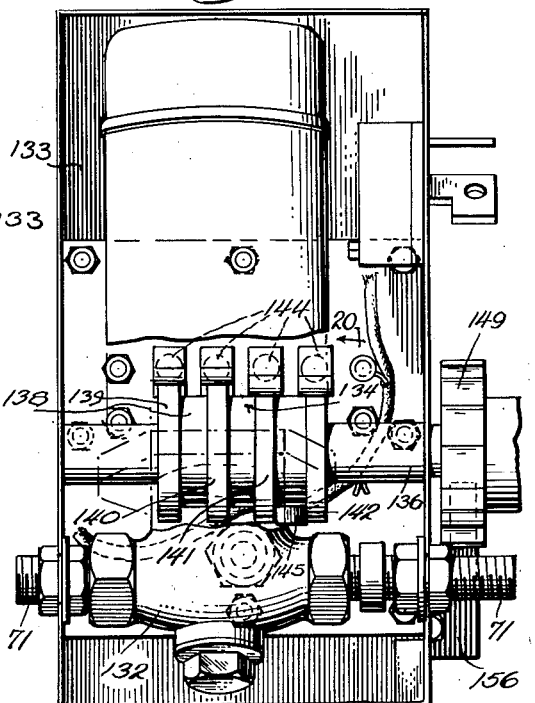
Figure 19 is a rear elevational view of the timing mechanism with the back wall and wiring removed to show the interior construction.
Figure 18:
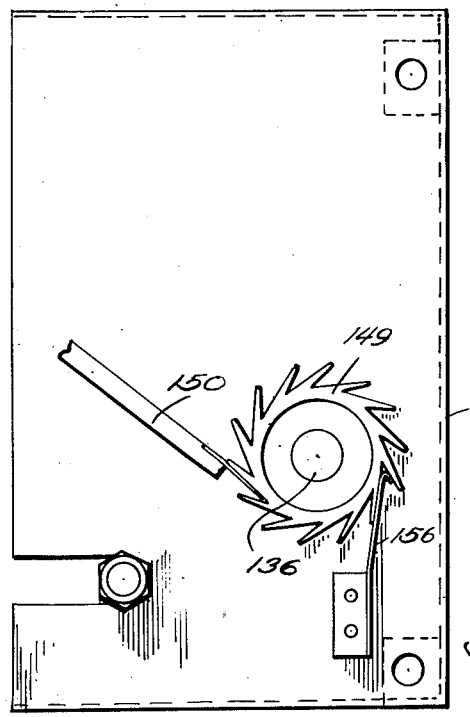
Figure 18 is a detail side elevational view of the timing mechanism.
Figure 20:
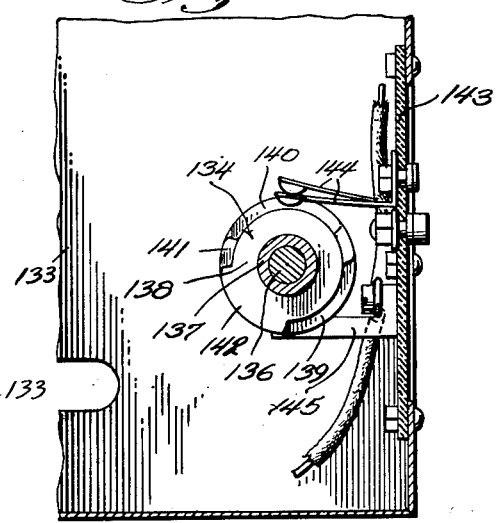
Figure 20 is a sectional detail taken on line 20—20 of Figure 19 with part of the mechanism removed.

The regulation of the temperature of the oven takes place through the use of an intermittent flame, controlled by a selective automatic timing mechanism. The timing mechanism includes an electrically operated solenoid fuel valve 132 (Figure 19) located in the fuel line 71, and housed in a metal case 133 (Figures 1, 3, 15, 17, 18, 19 and 20), and whose operation is controlled, as hereinafter explained, by a rotating timing switch 134 which in turn is actuated by the rotation of the reel of the oven. Thus the solenoid valve 132 in the fuel line automatically controls the flow of fuel from the tank 70 to the nozzle valve 124 of the burner. A conventional manual shut-off valve 135 (Figure 3) is also provided in the fuel line 71. The timing switch 134 (Figures 19 and 20) is also inclosed in the metal case 133 which is suitably fastened to one of the base legs, such as the leg 36 of the supporting frame at the burner end. In Figure 19, the solenoid fuel valve 132 is partially cut away to show the timing switch 134. The timing switch has a rotatable shaft 136 extending through the case 133, which shaft is provided with an insulating sleeve 137, upon which is carried the multiple cam member 138 having four cam lobes 139, 140, 141 and 142 serving as electrical contacts. These lobes extend circumferentially about the cam member 138 and are each of different circumferential length to form contacts of different length. Also the cams are formed with cutouts of different lengths forming electrical breaks of different periods, each cutout being associated with a particular cam lobe. The front panel of the case 133 has a section 143 of insulating material carrying inside the case four contact arms 144 which are arranged to make electrical contact, respectively, with the lobes 139, 140, 141 and 142, and another contact arm 145 to contact electrically the body 138 of the cam. Thus as shaft 136 rotates, each of the lobes 139, 140, 141 and 142 will contact their respective arms 144 for a different time, depending on the length of the lobe. Also, in view of the cutouts in the lobes there will be alternate making and breaking, the periods of making and breaking varying at each lobe. On the outside of the section of insulating material 143 there is a selective arrangement for selecting the particular cam lobe contact to be brought into the circuit. Thus swingable timer contact arm 146 has a knob 147 by which it may be brought selectively into contact with any one of six contact buttons 148. Stops 146' limit the movement of arm 146. Four of the buttons 148 are connected, respectively, through contact arms 144 to the cam lobes 139, 140, 141 and 142 so that a particular lobe may be brought into the circuit to select a particular period of making and breaking. The other two buttons provide a contact presenting a continuously open circuit and a continuously closed circuit, respectively. A pivoted guard member 133' (Figures 3 and 15) is hinged to upright 36 and which may be pivoted and suitably secured in closed position in front of case 133 to prevent accidental movement of the contact arm 146.

Figure 17:
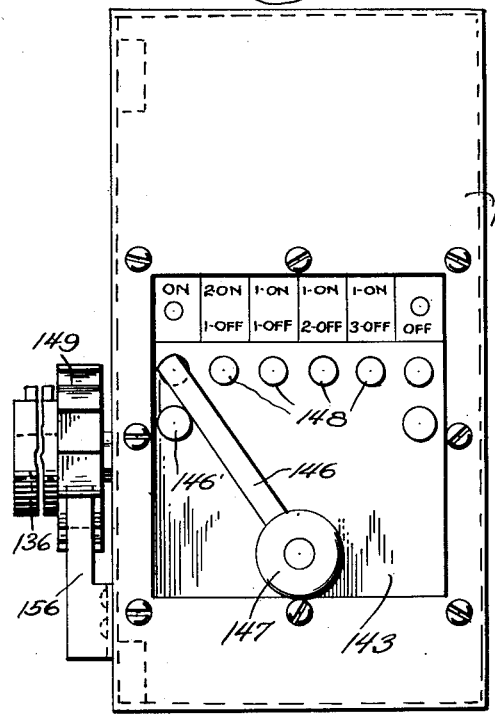
Figure 17 is a detail front elevational view of the timing mechanism.

The wiring connections of the timing mechanism are such that with the timer contact arm 146 on the contact button at the extreme right, as viewed in Figure 17, the circuit is continuously open, the solenoid valve 132 is closed, the transformer 130 is not excited, and no flame is formed in the oven burner. When the contact arm is on the contact button at the extreme left, the circuit is continuously closed, the solenoid valve is actuated to open position permitting fuel to flow continuously, and the transformer is excited to actuate the electrodes 126 to ignite the fuel in the burner to present a continuous flame. If the timer arm 146 is moved to the second button from the extreme left, the circuit is alternately made and broken through one of the cam lobes acting as a make-and-break contact. This cam lobe may be such that the burner is on for two periods and off for one period. If the arm is set on the third button from the left, a different cam lobe is brought into the circuit and the on-period, for example, may be equal to the off-period. With the arm 146 on the fourth button from the left, still a different cam lobe is brought into the circuit to present a different timing, for example, the on-period may be one-half the off-period. When the arm is on the fifth button from the left, the last cam lobe is utilized and the on-period, for example, may be one-third of the off-period. It is within the scope of this invention to modify the lengths of the cam lobes to utilize various timing schemes, the timing described being merely a preferred embodiment.

Figure 21:
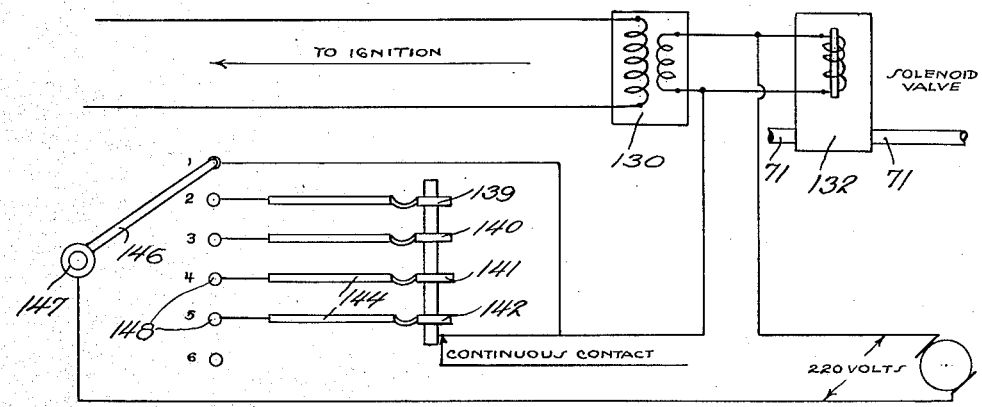
Figure 21 is a circuit diagram showing the electrical connection between the several parts, shown diagrammatically.

Figure 21 shows a circuit diagram with parts diagrammatically illustrated showing how the parts are electrically connected to perform the operation described above. Any source of electric energy may be utilized, for example, a power line or an individual generator. The transformer 130 and solenoid valve 132 are shown connected in parallel but may be connected in series. When contact arm 146 is on contact number 1, the coils of the transformer 130 and the solenoid 132 are energized continuously and burner operation is continuous. When the arm 146 is on contact number 6, the circuit is open and the burner is inoperative. When the arm 146 is on any of the contacts 2, 3, 4 or 5 there is intermittent energizing of the coils, the timing depending on which cam lobe is in the circuit.

The cam 138 preferably is operated by the rotation of the oven reel so that it rotates once for each two rotations of the reel. The structure for performing and synchronizing this operation is as follows: Outside the inclosing case 133, the shaft 136 carries a ratchet 149 which is actuated by a pawl 150 (Figures 3, 15, 16 and 18). The pawl 150 passes through a hole 151 (Figures 15 and 16) in the oven and is connected to the lower end of a link 150' pivoted to the lower end of an actuating arm 152 pivoted upon a bracket 153 fixed to the oven. The pawl is held in its lowermost position by a spring 154. The actuating arm 152 has a rounded portion 155 on its upper end which engages the rollers 87, successively, which are spaced about the stabilizer ring 86, whereby the actuating arm is rotated about its pivot to raise the pawl 150 intermittently. Upon disengagement of the actuating arm 152 from each of the rollers 87, the pawl 150 is returned to its lowermost position by the spring 154 and moves the ratchet 149 one notch, thus rotating the shaft 136 and cam member 138 in a step-by-step manner as the reel of the oven turns. A holding pawl 156 fixed on case 133 is provided to prevent backward motion of the ratchet 149.

A thermometer 157 is mounted in the oven body under a shield 158 which is hinged and adapted to be raised for reading the thermometer when the oven is in use.

To operate the oven burner 80, with adequate fuel in the fuel tank, the motor 63 is started and the air compressor 67 starts to build up pressure. When the pressure reaches about 40 pounds in the fuel tank 70, the fuel shut-off valve 135 near the tank is manually opened. The fuel needle 125 in valve 124 is manually opened about one-fourth of a turn only to restrict the amount of fuel entering the burner. The timer contact arm 146 is manually swung over to the extreme left (as viewed in Figure 17) to the On position to activate the solenoid valve 132 and the ignition transformer 130, and the flame forms at once. Then the needle 125 in valve 124 is manually adjusted to give a slightly milky-colored flame. The burner is permitted to operate continuously until the desired temperature, measured by thermometer 157, is reached, whereupon the timer arm 146 is turned selectively to one of the other contact buttons to produce a stop-and-go operation of such periodic time as to maintain the temperature desired under the particular baking conditions. To stop the flame, the timer arm 146 is manually swung over to the Off position at the extreme right, as viewed in Figure 17. The exhaust gases pass through the fire tube 113, the radiator tube 38, tube 42, tubular bracket 106 and exhaust tube 112, as shown by arrows in Figure 5.

The mechanical rotation of the oven reel, including the radiator tube 38 and shelves 40, is controlled by the shifter bar 59 over door 28, as described above, which bar is shifted to engage or disengage shaft 52 from the main drive to start or stop rotation of the oven reel. For loading the pans in the oven, the hand crank 54 may be utilized to turn the oven reel by hand to bring each of the shelves 40 successively to door level for loading.

It is evident that a baker's reel-type oven has been provided that embodies a rotary radiator tube or flue for distributing the heat uniformly to all the products being baked and includes a selective time-controlled burner to provide automatically for a substantially uniform, predetermined temperature throughout the whole baking period, and in which the timing of burning may be varied to obtain different temperatures for operation, and in which the burner is automatically controlled in synchronization with the speed of rotation of the oven reel. It is also evident that this invention provides a system of lubrication in a rotary reel-type oven which thoroughly and efficiently lubricates various moving parts normally difficult to lubricate because of their proximity to the highly heated portions of the oven. It is also apparent that an efficient screen cover, to prevent overbaking the tops of products, has been provided, which is permanently hinged to each shelf and which may be raised and lowered with a minimum of manual manipulation.

While the invention has been described in more or less detail, it is not to be limited thereby, as changes may be made in the form, arrangement and construction of parts, and equivalents may be substituted, without departing from the spirit and the scope of the invention as claimed, the form hereinbefore described being merely a preferred embodiment thereof.

I claim:

1. In a reel-type oven, an oven body having a pair of end walls, a pair of freely turning rollers mounted exteriorly on at least one of said end walls, a radiator tube extending through said oven body and mounted for rotation on said rollers, gear teeth fixed on one end of said radiator tube, said rollers having grooves in the plane of the gear teeth for freely receiving said gear teeth, and means including said gear teeth for rotating said radiator tube.

2. In a reel-type oven, an oven body, a pair of freely rotatable rollers mounted exteriorly on said oven body, a radiator tube extending through said oven body and mounted for rotation on said rollers, gear teeth fixed on one end of said radiator tube, said rollers provided with grooves in the plane of the gear teeth for freely receiving said gear teeth, a fixed burner assembly mounted on said oven body providing heat through said one end of said radiator tube, and means for lubricating said gear teeth and said rollers.

3. An oven comprising an oven chamber, a conveyor in said chamber, a plurality of shelves mounted on said conveyor for supporting baking pans, and a heat screen pivotally mounted on each of said shelves and adapted to rest on baking pans when lowered.

4. An oven comprising an oven body, a door opening in one of the walls of said oven body, a conveyor mounted for rotation within said oven body, a plurality of shelves for supporting baking pans, mounted on said conveyor, a heat screen for covering baking pans, pivotally mounted at the rear of each of said shelves, and means for holding each of said heat screens in raised position.

5. An oven as claimed in claim 4, wherein said last-mentioned means is positioned at the door opening to receive the weight of the screen and is to be released automatically responsive to movement of said conveyor.

6. An oven as claimed in claim 4, wherein said last-mentioned means comprises a projection on said screen and holding means mounted on one of the walls of said oven.

7. An oven as claimed in claim 4, wherein said last-mentioned means comprises a latch fixed to said screen and a hook mounted in one of the walls of said oven, and wherein means accessible at the front of said oven is provided to position said hook for engagement with said latch.

8. In an oven containing shelves for supporting baking pans, a heat screen for covering said pans comprising a frame and a wire mesh covering said frame.

9. In an oven, a shelf for supporting baking pans, and a heat screen for covering said pans, pivotally mounted to said shelf at pan height and resting on said pans.

10. In an oven, a shelf for supporting baking pans, a heat screen for covering said pans, pivotally mounted at pan height at the rear of said shelf and resting on pans at the front of said shelf, and means for supporting the front of said screen when pans are not used.

11. An oven comprising an oven body, a door opening in one of the walls of said oven body, a conveyor mounted for rotation within said oven body, a plurality of shelves for supporting baking pans, mounted on said conveyor, a heat screen pivotally mounted at the rear of each of said shelves for covering baking pans, means for holding each of said heat screens in raised position, said means comprising a latch mounted on the interior of the oven and adapted to be moved into cooperation with each screen as the screens are successively brought into position adjacent thereto.

12. An oven comprising an oven body, a door opening in one of the walls of said oven body, a conveyor mounted for rotation within said oven body, a plurality of shelves for supporting baking pans, mounted on said conveyor, a heat screen pivotally mounted at the rear of each of said shelves for covering baking pans, and a latch mounted on the interior of the oven adjacent the door opening for successive cooperation with the several screens as they are brought to position at the door opening.

13. An oven comprising an oven chamber, a fluid fuel burner for said oven, an oven reel rotatably mounted in the oven, an electrically-operated valve for said burner, and means intermittently operated by the reel for controlling the operation of said valve.

14. An oven comprising an oven chamber, a fluid fuel burner for said oven, an oven reel rotatably mounted in the oven, electrically-operated means for rotating said reel, a solenoid-operated valve for said burner, and means intermittently operated by the reel for controlling the flow of current to the solenoid.

15. An oven comprising an oven chamber, a fluid fuel burner for said oven, an oven reel rotatably mounted in the oven, electrically-operated means for rotating said reel, a solenoid-operated valve for said burner, a rotary means for controlling the flow of current to the solenoid, a pawl and ratchet for operating said rotary means, and means carried by the reel for operating the pawl and ratchet.

16. An oven comprising an oven chamber, a radiator tube extending through said chamber, a fire tube extending into said radiator tube and provided with openings spaced along its length, a burner for projecting a flame into one end of the fire tube, and a circular shield surrounding the end of the fire tube into which the flame is projected.

17. An oven comprising an oven chamber, a radiator tube extending through said chamber, a fire tube extending into and through said radiator tube, a burner for projecting a flame into one end of the fire tube, said fire tube provided with spaced openings throughout its length to permit the passage of the products of combustion from the fire tube into the radiator tube, and a disc-like baffle mounted in the radiator tube adjacent the exit end thereof, said baffle being spaced from the inner wall of the radiator tube to provide an annular passage for the discharge of the products of combustion.

18. An oven comprising an oven chamber, a radiator tube extending through said chamber, a fire tube extending into and through said radiator tube, a burner for projecting a flame into one end of the fire tube, said fire tube provided with spaced openings throughout its length to permit the passage of the products of combustion from the fire tube into the radiator tube, a disc-like baffle mounted in the radiator tube adjacent the exit end thereof, said baffle being spaced from the inner wall of the radiator tube to provide an annular passage for the discharge of the products of combustion, and a circular shield surrounding the end of the fire tube into which the flame is projected.

STYLES T. HOWARD.

(References on following page)

REFERENCES CITED

The following references are of record in the file of this patent:

UNITED STATES PATENTS

| Number | Name | Date |
|---|---|---|
| 775,913 | Dietz | Nov. 29, 1904 |
| 799,746 | Marsh | Sept. 19, 1905 |
| 1,483,167 | Eichner | Feb. 12, 1924 |
| 1,672,954 | Pointon | June 12, 1928 |
| 1,726,520 | Kramer | Aug. 27, 1929 |
| 1,838,395 | Hatch | Dec. 29, 1931 |
| 1,943,053 | Boisset | Jan. 9, 1934 |
| 2,040,328 | Olson | May 12, 1936 |
| 2,041,930 | Houlis | May 26, 1936 |
| 2,062,070 | Redmond | Nov. 24, 1936 |
| 2,145,482 | Houlis | Jan. 31, 1939 |
| 2,164,954 | Stephens | July 4, 1939 |
| 2,212,868 | Strong | Aug. 27, 1940 |
| 2,219,636 | Schwartz | Oct. 29, 1940 |
| 2,250,919 | Skelley | July 29, 1941 |
| 2,252,154 | Baak et al. | Aug. 12, 1941 |
| 2,385,919 | Holm | Oct. 2, 1945 |